United States Patent [19]

Kondo et al.

[11] Patent Number: 4,659,880
[45] Date of Patent: Apr. 21, 1987

[54] COMPOSITE SWITCH

[75] Inventors: Shiro Kondo; Kenji Sawada, both of Furukawa, Japan

[73] Assignee: Alps Electric Co., Ltd., Japan

[21] Appl. No.: 873,116

[22] Filed: Jun. 10, 1986

Related U.S. Application Data

[63] Continuation of Ser. No. 706,104, Feb. 27, 1985, abandoned.

[30] Foreign Application Priority Data

Feb. 27, 1984 [JP] Japan ............................. 59-27118[U]

[51] Int. Cl.⁴ .......................... H01H 3/00; H01H 9/00
[52] U.S. Cl. .................................. 200/5 R; 200/16 C; 200/18
[58] Field of Search ..................... 200/4, 61.54, 61.86, 200/153 J, 5 R, 17, 18, 16 C, 16 D

[56] References Cited

U.S. PATENT DOCUMENTS 4,054,761 10/1977 Raab et al. ............... 200/61.86 X
4,126,153 11/1978 Raab ....................... 200/61.86 X
4,129,757 12/1978 Cryer ........................... 200/4

Primary Examiner—J. R. Scott
Attorney, Agent, or Firm—Guy W. Shoup

[57] ABSTRACT

A composite switch for starting and stopping the air conditioner of a vehicle and for changing the flow of air supplied by an air blower comprises a main switch, a selector switch, and an auxiliary switch that is connected in series with the main switch. The main switch is used to start and stop the air conditioner. The selector switch is used to change the flow of air. A selector member for switching the contacts of the auxiliary switch from one state to another is disposed opposite to an actuating member for shifting the contacts of the selector switch such that whenever the selector switch is in a certain position, the actuating member drives the selector member to open the main switch. Thus, whenever the blower is stopped, the air conditioner is stopped.

6 Claims, 10 Drawing Figures

Fig. 6
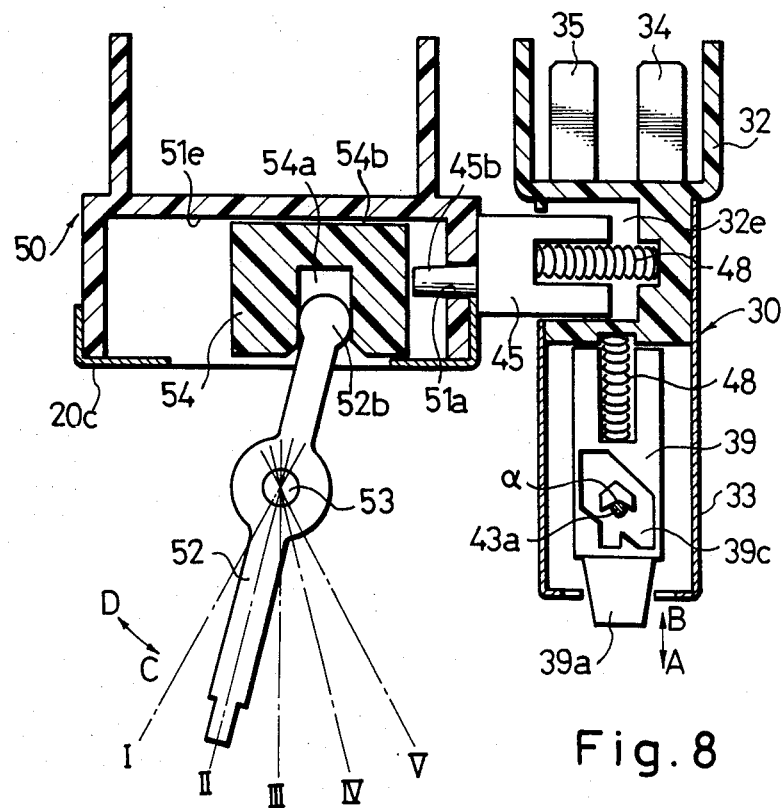
Fig. 7
Fig. 8
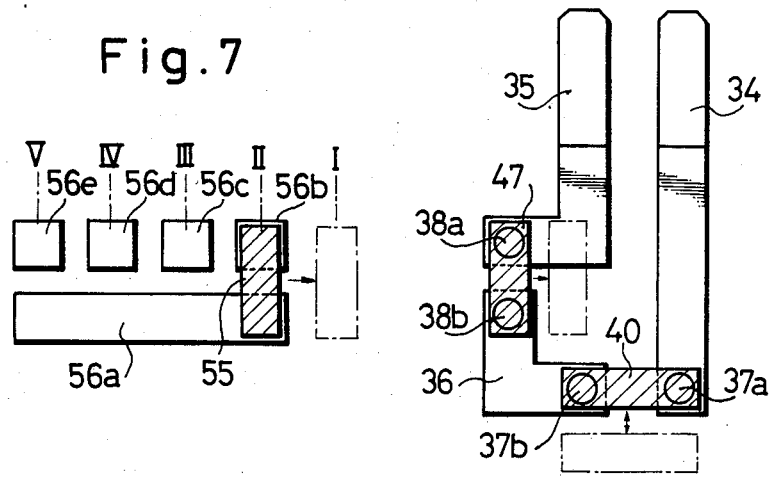

COMPOSITE SWITCH

This is a continuation application from application Ser. No. 706,104, filed Feb. 27, 1985, now abandoned.

FIELD OF THE INVENTION

The present invention relates to a composite switch acting to start and stop the air conditioner of a vehicle and also to change the flow of air supplied by an air blower from one level to another.

BACKGROUND OF THE INVENTION

Air conditioning systems for vehicles are generally equipped with an air conditioner and an air blower. To operate such a system, a main switch for starting and stopping the air conditioner and a selector switch for changing the flow of air supplied by the blower from one level to another are provided. The selector switch typically takes the form of a sliding switch, and has a stop position at which the blower is stopped. When the selector switch assumes this stop position, if the air conditioner is still in operation, the cooling coil will frost. Therefore, whenever the blower is stopped, the air conditioner is required to be stopped.

In order to fulfill this requirement, a composite switch is used in which an air flow selector switch interlocks with a main switch. Conventional composite switches of this kind are shown in FIGS. 1–3(C).

Referring first to FIG. 1, there are shown a main switch 1 and a selector switch 2. The main switch 1 is of a so-called push-pull type and serves to start and stop the air conditioner of a vehicle. The main switch 1 has an actuating member 3 which is provided with a heart-shaped grooved cam 3a. A ball 4 is biased into the cam 3a by a spring (not shown). Usually, the actuating member 3 is caused to protrude in the direction indicated by the arrow A by the action of the spring. Under this condition, the main switch is open. When the actuating member 3 is pushed in the direction indicated by the arrow B, the contacts complete an electrical circuit. At this time, the ball 4 slides along the grooved cam 3a until it comes to a halt in lock position $\alpha$, whereupon the actuating member 3 keeps the contacts in that condition. Then, if the actuating member 3 is pushed further, the ball 4 moves out of the lock position $\alpha$, and the action of the spring restores the actuating member 3 in the direction indicated by the arrow A to open the switch. The ball 4 is only allowed to move laterally in the drawing by means of a slot 5a formed in a limiting member 5.

The selector switch 2 comprises a casing 6 made from an insulating material and a cover 7 made of a metal plate. The casing 6 cooperates with the cover 7 to form a frame, in which an operating member 8 made from an insulating material can slide. A sliding contact 8a is held to the operating member 8. The casing 6 has one surface 6a to which a plurality of fixed contacts (not shown) are securely fixed. An actuating lever 9 has its front end 9a engaged in the operating member 8, and is rotatable about a pivot 10.

When the actuating lever 9 is turned in the direction indicated by the arrow C, the operating member 8 is shifted to the left as viewed in the figure to bring the sliding contact 8a into contact with the contact on the left side. This changes the flow of air supplied by the air blower to a higher level. If the lever 9 is gradually turned in the direction indicated by the arrow D from that position, the operating member 8 is moved to the right to bring the sliding contact 8a into contact with the other fixed contacts in turn. Thus, the flow of air supplied by the blower is reduced in stepwise fashion. When the lever 9 is fully turned in the direction indicated by the arrow D, the blower stops. At this time, the operating member 8 pushes one end 5b of the limiting member 5, which is usually retained in the position shown in FIG. 1 by the spring. Then, the limiting member 5 is moved to the right (see FIG. 2), and the slot 5a in the limiting member 5 pushes the ball 4 to the right. Accordingly, even if the actuating member 3 of the main switch 1 is locked in a position along the direction indicated by the arrow B, i.e., the switch is closed, the movement of the limiting member 5 moves the ball 4 out of the lock position $\alpha$ in the cam 3a. Immediately thereafter, the actuating member 3 returns in the direction indicated by the arrow A to open the main switch 1, thus stopping the air conditioner.

Referring next to FIGS. 3(A)–3(C), there is shown another prior art composite switch which comprises a main switch 1 and a selector switch 2. The switch 2 is the same as the selector switch 2 shown in FIG. 1. The main switch 1 has an actuating member 3 that is formed with a heart-shaped grooved cam 3a in which the front end 11a of a pin 11 is inserted. When the front end 11a of the pin 11 is retained in position $\alpha$ in the cam 3a, if the actuating member 3 is turned in the direction indicated by the arrow B, it is locked. The pin 11 is biased into the cam 3a by a spring 12. A limiting member 13 has an inclined surface 13a lying below the pin 11. When the actuating lever 9 of the selector switch 2 is turned in the direction indicated by the arrow D to stop the blower, the operating member 8 causes the limiting member 13 to move to the right. Then, the inclined surface 13a pushes the pin 11 upward. Thus, even if the front end 11a of the pin 11 is engaged in the lock position $\alpha$, when the pin is raised, it comes out of the lock position. Then, the actuating member 3 returns in the direction indicated by the arrow A, opening the main switch 1.

In the conventional composite switches described above, when the operating member 8 of the selector switch 2 is moved in one direction, the lock member 4 or 11 of the main switch 1 is forced to move toward the direction to open the switch 1. That is, the actuating member 3 itself of the main switch 1 is fully restored in the direction to open the switch. Accordingly, in order to restart the air conditioner, the actuating lever 9 of the selector switch 2 must be actuated to start the blower. Further, the actuating member 3 of the main switch 1 must be pushed again. When a person is driving the vehicle, it is cumbersome for him to perform these operations. In addition, he tends to forget to depress the main switch 1. Furthermore, since mechanical action is employed to open the main switch 1, a complicated mechanism is needed to unlock the main switch. Also, there is the possibility of malfunction.

SUMMARY OF THE INVENTION

In view of the foregoing difficulties with the prior art switches, it is the main object of the present invention to provide a composite switch which comprises a main switch having contacts, an operating member for connecting and disconnecting the contacts of the main switch with each other, a selector switch having contacts that can be moved to a plurality of positions by an actuating member, and an auxiliary switch connected in series with the contacts of the main switch and having contacts that are switched between different states by a selector member, the selector member being disposed opposite to the actuating member in such a way that the selector member can be driven by the actuating member, the auxiliary switch being actuated by the actuating member for the selector switch to connect and disconnect the contacts of the main switch with each other.

BRIEF DESCRIPTION OF THE DRAWINGS

FIG. 6 is a plan view partially in section of the composite switch shown in FIG. 4;

FIG. 7 shows the structure of the contacts of the selector switch included in the composite switch shown in FIG. 4; and FIG. 8 shows the structure of the contacts of the main switch included in the composite switch shown in FIG. 4.

DETAILED DESCRIPTION OF THE INVENTION

Figure 1:
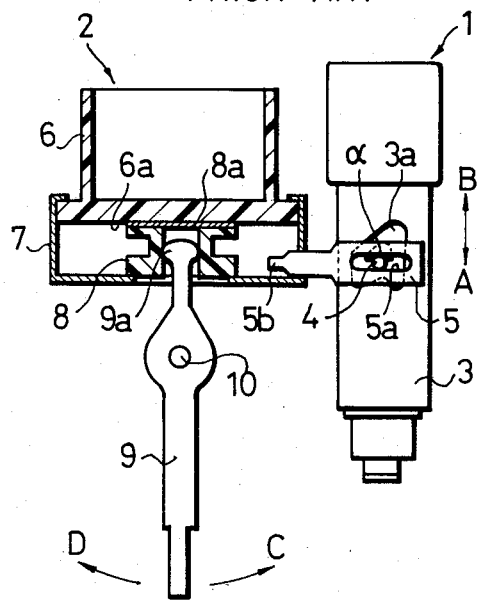
FIG. 1 is a schematic plan view partially in section of a conventional composite switch.
Figure 2:
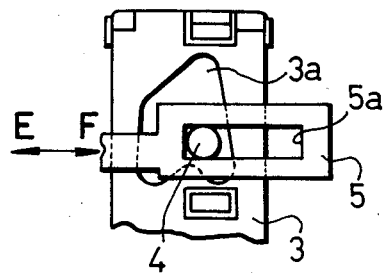
FIG. 2 is a fragmentary enlarged view of the switch shown in FIG. 1.
Figure 3A:
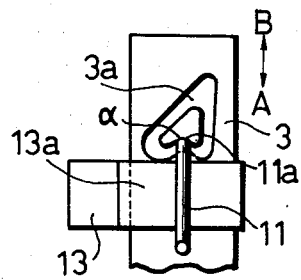
FIG. 3(A) is a fragmentary plan view of the main switch of another conventional main switch.
Figure 3B:
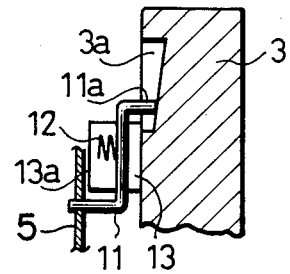
FIG. 3(B) is a cross-sectional view of the main switch shown in FIG. 3(A)
Figure 3C:
FIG. 3(C) is a side elevation of the main switch shown in FIG. 3(A)
Figure 4:
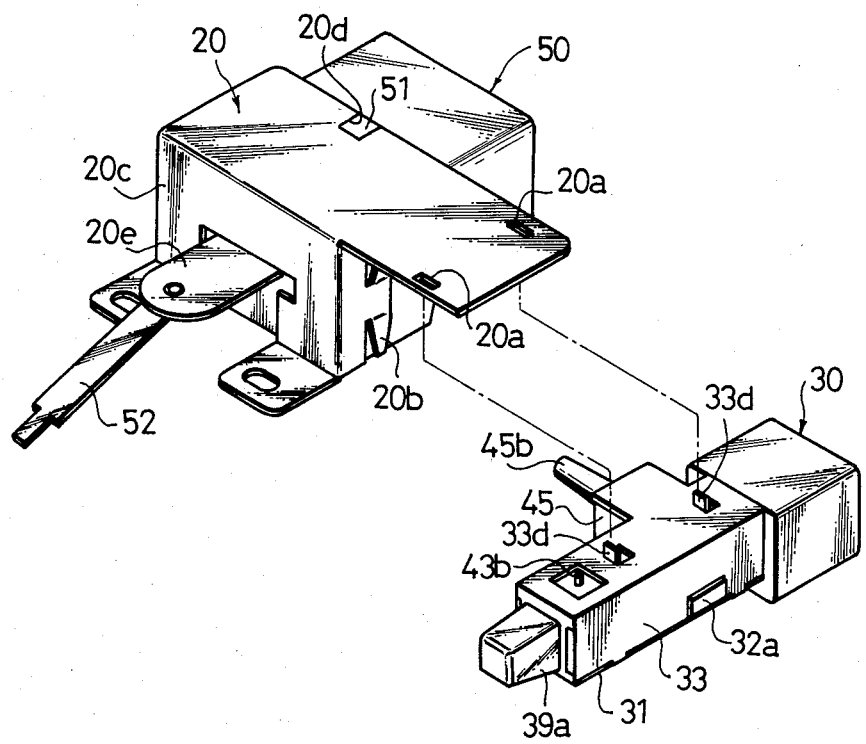
FIG. 4 is a perspective view of a composite switch according to the present invention.
Figure 5:
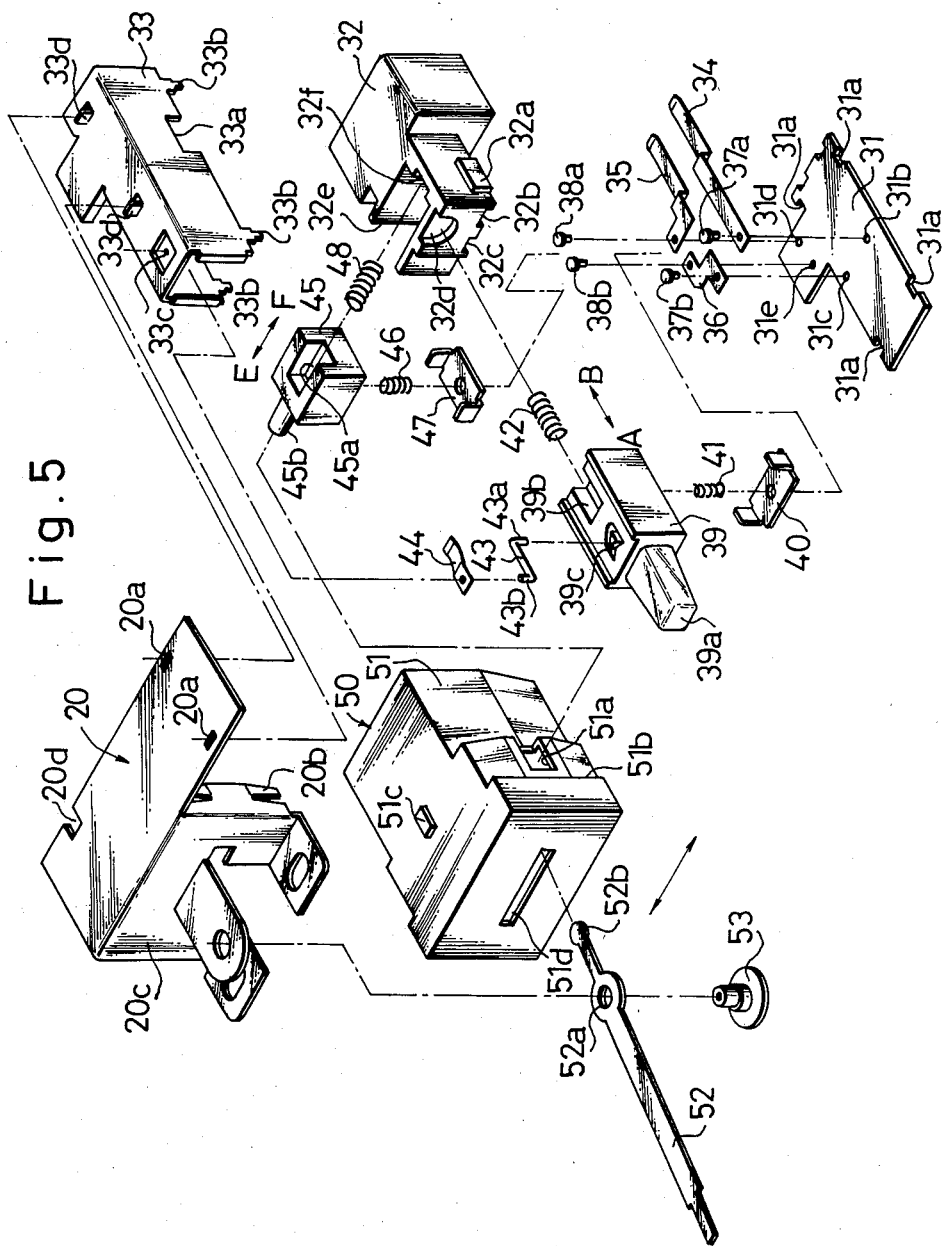
FIG. 5 is an exploded perspective view of the composite switch shown in FIG. 4.

Referring to FIG. 4, there is shown a composite switch embodying the concept of the present invention. This composite switch is comprises a metal frame 20 in which a main switch 30 and a selector switch 50 are held. In case where this composite switch is used for the air conditioning system of a vehicle, the main switch 30 is employed to start and stop the air conditioner, while the selector switch 50 is used to control the flow of air supplied by the air blower.

The main switch 30 consists of an insulating substrate 31, a holder 32 made from a syntheric resin and disposed on the substrate 31 at the rear side of the substrate, and a metal cover 33 that covers the upper side of the holder 32. The cover 33 is provided with a notch 33a in the lower portion of one side surface of the cover 33. A protrusion 32a is formed on one side of the holder 32, and fits in the notch 33a to locate the holder 32 relative to the cover 33. Four grooves 31a are formed on opposite sides of the substrate 31. Four corresponding small projections 33b are formed on the bottom of the cover 33. The projections 33b engage the grooves 31a and are bent toward the back side of the substrate 31 to rigidly fix the cover 33 to the substrate 31.

Installed on the insulating substrate 31 are two terminals 34 and 35 and a conductive plate 36. The front end of the terminal 34 is fixed by a contact pin 37a to a hole 31b that is formed in the substrate 31. Similarly, the front end of the other terminal 35 is anchored by a contact pin 38a to a hole 31d formed in the substrate 31. The conductive plate 36 has one end that is fixed by a contact pin 37b to a hole 31c formed in the substrate 31. The other end of the plate 36 is fixed by a contact pin 38b to a hole 31e. In this way, several contacts are formed on the substrate 31.

Referring next to FIG. 8, the arrangement of these contacts is shown. The contact pin 37a is not electrically connected to the contact pin 37b. The pins 37a and 37b constitute the fixed pins of the main switch 30. Also, the contact pin 38a is not electrically connected to the contact pin 38b. These pins 38a and 38b constitute the contacts of an auxiliary switch. The contacts 37a and 37b of the main switch are connected in series with the contacts 38a and 38b of the auxiliary switch via the conductive plate 36. Two grooves 32b and 32c are formed in the lower surface of the holder 32 which is disposed on the substrate 31. The terminals 34 and 35 are held in the grooves 32b and 32c, respectively.

An actuating member 39 is held in the front portion of the cover 33 such that it can slide in the directions indicated by the arrows A and B. An actuating button 39a is formed integrally with the front end of the actuating member 39, and protrudes from the cover 33. The lower surface of the actuating member 39 is provided with a groove (not shown) in which the upper end of a spring 41 is retained. The actuating member 39 further has a sliding contact 40 that is biased by the spring 41. As shown in FIG. 8, this sliding contact 40 moves together with the actuating member 39 in the directions indicated by the arrows A and B to cause the fixed contacts 37a and 37b to make and break the electrical circuit. The upper surface of the actuating member 39 is formed with a support groove 39b. A return spring 42 is mounted between the groove 39b and a receiving recess 32d formed in the holder 32. The resilience of this spring 42 always biases the actuating member 39 in the direction indicated by the arrow A, keeping the main switch in its open state. A heart-shaped groove cam 39c is formed in the upper surface of the actuating member 39. A pin 43 is mounted above the cam 39c, the front end 43a of the pin 43 being slidable in the cam 39c. The base 43b of the pin 43 is bent upward and rotatably supported in a hole 33c formed in the cover 33. Held to the base 43b of the pin 43 is a leaf spring 44 which presses the front end 43a of the pin 43 into the grooved cam 39c. The holder 32 is provided with a recess 32e in its one side surface. A selector member 45 is so received in the recess 32e as to be movable in the directions indicated by the arrows E and F. A sliding contact 47 is mounted to the bottom of the selector member 45 via a spring 46. As shown in FIG. 8, this contact 47 serves to make and break the electrical circuit including the fixed contacts 38a and 38b of the auxiliary switch. A support groove 45a is formed in the upper surface of the selector member 45. A return spring 48 is interposed between the groove 45a and a receiving recess 32f formed in the holder 32. The selector member 45 is biased in the direction indicated by the arrow E by the action of the spring 48, whereby the auxiliary switch is maintained closed. A protrusion 45b is formed integrally with the front end of the selector member 45, and is inserted in a hole 51a that is formed in one side surface of the cover 51 of the selector switch 50.

Two portions of the upper surface of the cover 33 in the main switch 30 are cut and bent upward to form a pair of projections 33d, which are inserted in holes 20a formed in the frame 20. Then, the projections 33d are bent to securely fix the main switch 30 to the frame 20.

The selector switch 50 has a casing 51 molded from a synthetic resin. As described above, the hole 51a is formed in one side surface of the casing 51. A ledge 51b is formed on this side surface near the front side of the switch 50. The frame 20 is provided with a small projection 20b that is fitly received on the ridge 51b to fixedly secure the cover 51 to the frame 20. A front cover 20c is formed by folding the front portion of the cover 20, and is installed on the front surface of the casing 50. The upper surface of the casing 50 is provided with a protrusion 51c which fits in a notch 20d formed in the frame 20 to locate the frame 20 relative to the casing 51.

An actuating lever 52 is centrally provided with a support hole 52a in which an anchoring pin 53 is inserted. The pin 53 is mounted to a support arm 21e protruding forwardly of the frame 20. The lever 52 has a connecting portion 52b at its front end. The connecting portion 52b is inserted in the casing 50 through a slit 51d formed in the front side of the casing 50. As shown in FIG. 6, an operating member 54 is mounted inside the cover 51 so as to be slidable right and left as viewed in FIG. 6. The front surface of the operating member 54 is provided with a recess 54a in which the connecting portion 52b of the lever 52 is inserted. Thus, when the lever 52 is pushed down in the direction indicated by the arrow C, the operating member 54 is moved to the left. When the lever 52 is turned in the direction indicated by the arrow D, the member 54 is shifted to the right.

A sliding contact 55 is mounted on the back surface 54b of the operating member 54. As shown in FIG. 7, this sliding contact 55 is rectangular in shape. Fixed contacts 56a-56e are mounted on the inner surface 51e of the casing 51. Among these fixed contacts 56a-56e, the contact 56a is a common contact, while the other contacts 56b-56e are arranged according to the positions for switching. The common contact 56a is electrically connected to any one of the fixed contacts 56b-56e by the sliding contact 55. The protrusion 45b of the selector member 45 which switches the auxiliary switch among different positions is disposed opposite to the right side portion of the operating member 54 inside the casing 51.

In the operation of the composite switch constructed as described above, when the main switch 30 is open, the actuating member 39 is caused to protrude in the direction indicated by the arrow A by the action of the spring 42. Under this condition, as shown in FIG. 8, the sliding contact 40 integral with the actuating member 39 assumes the position indicated by the dot-and-dash line, and the two contacts 37a and 37b are not inserted in the electrical circuit. When the actuating button 39a is pushed in the direction indicated by the arrow B to start the air conditioning system of the vehicle, the sliding contact 40 is shifted to the position indicated by the hatching in FIG. 8, so that the contacts 37a and 37b are inserted in the electrical circuit. When the actuating member 39 is being moved, the front end 43a of the pin 43 slides in the grooved cam 39c until it is engaged in the lock position α (see FIG. 6) in the cam 39c. Then, the member 39 is retained in this position. When the main switch 30 is opened, the button 39a is pushed again in the direction indicated by the arrow B. Then, the front end 43a of the pin 43 comes out of the lock position α. The result is that the return spring 42 restores the actuating member 39 in the direction indicated by the arrow A.

The flow of air supplied by the air blower is changed to other level by operating the actuating lever 52 of the selector switch 50. When the lever 52 is pushed down to position I in the direction indicated by the arrow D of FIG. 6, the operating member 54 is moved to the rightmost position in the casing 50. At this time, the sliding contact 55 held to the operating member 54 is shifted to position I of FIG. 7. Since none of the fixed contacts 56a-56e lie in this position I, the selector switch 50 is open, and the blower is not in operation. When the actuating lever 52 is turned in the direction indicated by the arrow C to positions II-V in turn, the operating member 54 is slided to the left in the casing 50. When the sliding contact 55 is in position II, the fixed contacts 56a and 56b are inserted in the electrical circuit, as shown in FIG. 7. At this time, the flow of air supplied by the blower is changed to a lower level. Similarly, when the lever 52 are brought to positions III, IV, and V in turn, the contact 55 makes contact with the contacts 56c, 56d, and 56e, respectively, while kept in contact with the common contact 56a. When the lever 52 is shifted from the position III to the position V in turn, the flow of air supplied by the blower is changed to higher levels in stepwise manner.

As described already, the protrusion 45b of the selector member 45 which holds the sliding contact 47 of the auxiliary switch is inserted in the right end portion of the casing 50 as shown. Accordingly, when the actuating lever 52 is shifted to the position I, i.e., when the blower is stopped, the operating member 54 which has moved to the right end of the casing pushes the protrusion 45b, shifting the selector member 45 to the right. Then, the sliding contact 47 is moved to the position indicated by the dot-and-dash line in FIG. 8, disengaging the contacts 38a and 38b from the electrical circuit. Hence, even if the contacts 37a and 37b are inserted in the circuit by the sliding contact 40 of the main switch 30, the sliding contact 47 of the auxiliary switch disengages from the closed circuit, thus opening the circuit.

Thus, when the actuating lever 52 of the selector switch 50 is in the position I and the blower is at rest, if the button 39a of the main switch 30 is pushed, the air conditioner will not be started. Under this condition, however, if the lever 52 is shifted to the position II or any following position to start the blower, the operating lever 54 moves away from the protrusion 45b. Then, the return spring 48 restores the selector member 45 to the left as viewed in the drawing. As a result, the sliding contact 47 is moved to such a position that the contacts 38a and 38b are introduced in the electrical circuit, leading to start of the air conditioner. When the blower and the air conditioner are operated at the same time, if the actuating lever 52 is brought to the position I to stop the blower, the air conditioner will be automatically stopped.

In the illustrative example, the auxiliary switch has the sliding contact 47 and the two fixed contacts 38a and 38b as the contact structure. As a modified example, the auxiliary switch has a contact structure constituted by leaf-spring switches. Also, a rotary switch may be used instead of the sliding switch which is employed as the selector switch 50. In this case, when the rotor that causes switching action for the contacts reaches a predetermined angular position, the auxiliary switch may be operated.

As can be understood from the description thus far made, the present invention offers various advantages as follows.

(1) The main switch whose contacts are connected and disconnected with each other by the operating member is mounted together with the selector switch whose movable contact is switched between a plurality of positions. The auxiliary switch is placed in series with the contacts of the main switch. The selector member for switching the contacts of the auxiliary switch between different states is disposed opposite to the actuating member for moving the contact of the selector switch such that the selector member is driven by the actuating member. Thus, whenever the selector switch assumes a certain position, the main switch is opened. As an example, this composite switch may be used for the air-conditioning system of a vehicle such that the air conditioner is started and stopped by the main switch and that the flow of air supplied by the air blower is changed to another level by the selector switch. In this case, whenever the blower is stopped, the air conditioner ceases to operate. Consequently, the cooling coil is prevented from frosting.

(2) The main switch is electrically opened and closed by the auxiliary switch without the need to push a button. In the conventional composite switch where a main switch is mechanically opened, a button is required to be pushed to close the main switch again after the main switch is opened. In the novel composite switch, operation of the selector switch automatically closes the main switch. Hence, the main switch is not required to be operated to start the air conditioner each time the air blower is started. Consequently, where the composite switch is used for the air-conditioning system of a vehicle, the driver can operate it with safety.

(3) The novel composite switch is simpler in structure and is made up of a less number of components than the switch where the main switch is mechanically opened and closed and so the novel switch is cheaper to manufacture. In addition, the novel switch fails much less frequently than mechanical switches.

What is claimed is:

1. A composite switch comprising:
   a switch assembly, including a main switch and an auxiliary switch, having a pair of terminals, a main pair of fixed contacts, and an auxiliary pair of fixed contacts, wherein one of said terminals is electrically connected to one contact of said main pair of fixed contacts, the other of said terminals is electrically connected to one contact of said auxiliary pair of fixed contacts, and the other contact of said main pair of fixed contacts is electrically connected to the other contact of said auxiliary pair of fixed contacts, said main pair of fixed contacts being spaced apart and adapted to be bridged by a main movable contact member, and said auxiliary pair of fixed contacts being spaced apart and adapted to be bridged by an auxiliary movable contact member, said pair of terminals being electrically connected in a series circuit when said main movable contact member of said main switch and said auxiliary movable contact member of said auxiliary switch are moved to bridge said main and auxiliary pair of fixed contacts, respectively;
   an operating member for moving said main movable contact member to connect or disconnect said main pair of fixed contacts with each other;
   a selector switch having a plurality of fixed contacts arrayed in a plurality of positions and an acutuating member for moving a movable contact in contact with any of said plurality of fixed contacts; and
   an auxiliary member operable between said switch assembly and said selector switch, said auxiliary member moving said auxiliary movable contact member to connect or disconnect said auxiliary pair of fixed contacts when said actuating member of said selector switch is moved to a predetermined position.

2. A composite switch as set forth in claim 1, wherein the selector switch is a sliding switch.

3. A composite switch as set forth in claim 1, wherein the main switch is used to start and stop the air conditioner of a vehicle, and wherein the selector switch is used to switch the slow of air supplied by an air blower between prescribed levels.

4. A composite switch as set forth in claim 3, wherein said auxiliary member of said auxiliary switch is moved to disconnect said auxuliary pair of fixed contacts to stop the air conditioner, whether the operating member of said main switch is closed or open and whenever the actuating member of said selector switch is moved to said predetermined position which corresponds to a selector switch position to stop the air blower.

5. A composite switch as set forth in claim 1, wherein said predetermined position of said actuating member is arranged at one end of said plurality of positions of said selector switch, and said auxiliary member is arranged to be moved to disconnect said auxiliary pair of fixed contacts upon movement of said actuating member at said predetermined position.

6. A composite switch as set forth in claim 5, wherein said auxiliary switch further includes biasing means for maintaining said auxiliary member in a second predetermined position to connect said auxiliary pair of fixed contacts when said actuating member is moved to positions other than the first said predetermined position.

* * * * *